United States Patent
Teregowda et al.

(10) Patent No.: US 11,016,985 B2
(45) Date of Patent: May 25, 2021

(54) PROVIDING RELEVANT EVIDENCE OR MENTIONS FOR A QUERY

(71) Applicant: INTERNATIONAL BUSINESS MACHINES CORPORATION, Armonk, NY (US)

(72) Inventors: Pradeep Teregowda, Fremont, CA (US); Sumit Bhatia, New Delhi (IN); Anshu Jain, Sunnyvale, CA (US); Daya Vivek, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 15/986,498

(22) Filed: May 22, 2018

(65) Prior Publication Data
US 2019/0362012 A1 Nov. 28, 2019

(51) Int. Cl.
*G06F 16/00* (2019.01)
*G06F 16/248* (2019.01)
*G06F 16/901* (2019.01)

(52) U.S. Cl.
CPC ........ *G06F 16/248* (2019.01); *G06F 16/9024* (2019.01)

(58) Field of Classification Search
CPC ............................ G06F 16/248; G06F 16/9024
See application file for complete search history.

(56) References Cited

U.S. PATENT DOCUMENTS

| | | | |
|---|---|---|---|
| 7,827,125 B1 * | 11/2010 | Rennison | G06N 20/00 706/14 |
| 8,977,953 B1 * | 3/2015 | Pierre | G06F 40/284 715/230 |
| 9,323,827 B2 * | 4/2016 | Schilit | G06F 16/313 |
| 9,348,815 B1 | 5/2016 | Estes et al. | |
| 9,535,902 B1 | 1/2017 | Michalak et al. | |
| 9,558,263 B2 * | 1/2017 | Visotski | G06F 16/338 |

(Continued)

OTHER PUBLICATIONS

Hunter, A. et al.; "Aggregating evidence about the positive and negative effects of treatments"; Department of Computer Science, University College, London; a.hunter@cs.udl.sc.uk; Sep. 20, 2012, 36 pages.

(Continued)

*Primary Examiner* — Leslie Wong
(74) *Attorney, Agent, or Firm* — Conley Rose, P.C.

(57) ABSTRACT

A computer-implemented method includes determining first passages (FP) that provide evidence for one or more first relations (OOMFR) between first entities in a knowledge graph. The method includes generating an evidence index (EI) that associates the FP with the OOMFR and the first entities, receiving a query subsequent to generating the EI, and identifying, using the EI, the FP responsive to receiving the query. The method includes determining presentation aspects of the FP based on similarity information determined for the FP, and determining that second passages of the FP are substantially similar to at least one other passage of the FP. The method includes pruning the FP to generate a pruned set of passages (PSOP) that includes one or more third passages of the second passages and that does not include any other passages of the second passages. The method includes outputting the PSOP according to the presentation aspects.

20 Claims, 3 Drawing Sheets

(56) References Cited

U.S. PATENT DOCUMENTS

| | | | |
|---|---|---|---|
| 9,904,667 B2* | 2/2018 | Kalyanpur | G06F 40/211 |
| 2005/0065777 A1* | 3/2005 | Dolan | G06F 40/30 |
| | | | 704/10 |
| 2009/0055394 A1* | 2/2009 | Schilit | G06F 16/3344 |
| 2012/0078889 A1* | 3/2012 | Chu-Carroll | G06F 16/248 |
| | | | 707/723 |
| 2015/0120717 A1* | 4/2015 | Kim | G06F 16/335 |
| | | | 707/727 |
| 2016/0078102 A1* | 3/2016 | Crouch | G06F 16/313 |
| | | | 707/722 |
| 2016/0147763 A1* | 5/2016 | Kalyanpur | G06F 16/3344 |
| | | | 707/728 |
| 2016/0180217 A1* | 6/2016 | Boston | G06F 16/248 |
| | | | 706/46 |
| 2016/0203130 A1* | 7/2016 | Roque | G06F 16/93 |
| | | | 707/741 |
| 2016/0321357 A1* | 11/2016 | Novacek | G06F 16/367 |
| 2017/0109355 A1 | 4/2017 | Li et al. | |
| 2017/0242921 A1* | 8/2017 | Rota | G06F 16/353 |
| 2018/0082183 A1* | 3/2018 | Hertz | G06K 9/6259 |
| 2018/0165554 A1* | 6/2018 | Zhang | G06K 9/6256 |

OTHER PUBLICATIONS

Wechsler, H. et al.; "Intelligent Evidence-Based Management for Data Collection and Decision-Making Using Algorithmic Randomness and Active Learning"; Intelligent Information Management, vol. 3, Jul. 2011, pp. 142-159.

Meij, E. et al.; "Method and System for Automatically Explaining Entity Relationships in a Knowledge Graph"; http://ip.com/IPCOM/000242025D; Jun. 15, 2015, 3 pages.

Anonymously; "A new method to rank the clinical evidence search results"; http://ip.com/IPCOM/000206836D; May 10, 2011, 4 pages.

Anonymously; "Including Key Terms from Watched Hypotheses and Passages in User Profiles for use in Query Formation to Bias Search in Direction of Demonstrated Customer Intent"; http://ip.com/IPCOM/000250419D; Jul. 12, 2017, 4 pages.

Anonymously; "Context-Based Concept Resolution with Structured and Unstructured Sources"; http://ip.com/IPCOM/000246223D; May 17, 2016, 7 pages.

* cited by examiner

PROVIDING RELEVANT EVIDENCE OR MENTIONS FOR A QUERY

BACKGROUND

A knowledge graph includes entities and relations between the entities. Entities in a knowledge graph are supported by passages including sentences in a text corpus. The supporting passages are referred to as evidence or mentions.

SUMMARY

According to an aspect of the present disclosure, a computer-implemented method includes determining first passages of a text corpus that provide evidence for one or more first relations between first entities in a knowledge graph. The computer-implemented method includes generating an evidence index that associates the first passages with the one or more first relations and the first entities. The computer-implemented method includes receiving a query subsequent to generating the evidence index. The computer-implemented method includes identifying, using the evidence index, the first passages responsive to receiving the query. The computer-implemented method includes determining presentation aspects of the first passages based on similarity information determined for the first passages. The computer-implemented method includes determining that second passages of the first passages are substantially similar to at least one other passage of the first passages. The computer-implemented method includes pruning the first passages to generate a pruned set of passages that includes one or more third passages of the second passages and that does not include any other passages of the second passages. The computer-implemented method includes outputting the pruned set of passages according to the presentation aspects responsive to the query.

According to an aspect of the disclosure, a non-transitory computer readable storage media stores instructions that, when executed by a computer, cause the computer to determine first passages of a text corpus that provide evidence for one or more first relations between first entities in a knowledge graph. The instructions, when executed by the computer, cause the computer to generate an evidence index that associates the first passages with the one or more first relations and the first entities. The instructions, when executed by the computer, cause the computer to receive a query subsequent to generating the evidence index. The instructions, when executed by the computer, cause the computer to identify, using the evidence index, the first passages responsive to receiving the query. The instructions, when executed by the computer, cause the computer to determine presentation aspects of the first passages based on similarity information determined for the first passages. The instructions, when executed by the computer, cause the computer to determine that second passages of the first passages are substantially similar to at least one other passage of the first passages. The instructions, when executed by the computer, cause the computer to prune the first passages to generate a pruned set of passages that includes one or more third passages of the second passages and that does not include any other passages of the second passages. The instructions, when executed by the computer, cause the computer to output the pruned set of passages according to the presentation aspects responsive to the query.

According to an aspect of the disclosure a computer system includes memory storing program instructions. The computer system includes a processor coupled to the memory and configured to execute the program instructions stored on the memory to cause the processor to receive an input statement referencing first entities. The processor is configured to execute the instructions to determine first passages of a text corpus that provide evidence for one or more first relations between first entities in a knowledge graph. The processor is configured to execute the instructions to generate an evidence index that associates the first passages with the one or more first relations and the first entities. The processor is configured to execute the instructions to receive a query subsequent to generating the evidence index. The processor is configured to execute the instructions to identify, using the evidence index, the first passages responsive to receiving the query. The processor is configured to execute the instructions to determine presentation aspects of the first passages based on similarity information determined for the first passages. The processor is configured to execute the instructions to determine that second passages of the first passages are substantially similar to at least one other passage of the second passages. The processor is configured to execute the instructions to prune the first passages to generate a pruned set of passages that includes one or more third passages of the second passages and that does not include any other passages of the second passages. The processor is configured to execute the instructions to output the pruned set of passages according to the presentation aspects responsive to the query.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an" and "the" are intended to include the plural forms as well, unless the context clearly indicates otherwise.

An engine as referenced herein may comprise software components such as, but not limited to, computer-executable instructions, data access objects, service components, user interface components, application programming interface (API) components; hardware components such as electrical circuitry, processors, and memory; and/or a combination thereof. The memory may be volatile memory or non-volatile memory that stores data and computer executable instructions. The computer-executable instructions may be in any form including, but not limited to, machine code, assembly code, and high-level programming code written in any programming language. The engine may be configured to use the data to execute one or more instructions to perform one or more tasks.

Embodiments of the disclosure include a system that determines and provides a client device evidence or mentions associated with a query from the client device. The system determines the evidence or mentions using an evidence index generated prior to receiving the query. The evidence index enables the system to determine the evidence or mentions without having to process a corpus after receiving the query to determine the evidence or mentions. Additionally, the system prunes the evidence or mentions to avoid overloading a user with evidence or mentions that are substantially similar to each other. Additionally, the system determines, and outputs the evidence or mentions according to, presentation aspects that cause the evidence or mentions to be presented in a manner that indicates evidence or mentions that may be of most interest to a user of the client device.

Figure 1:
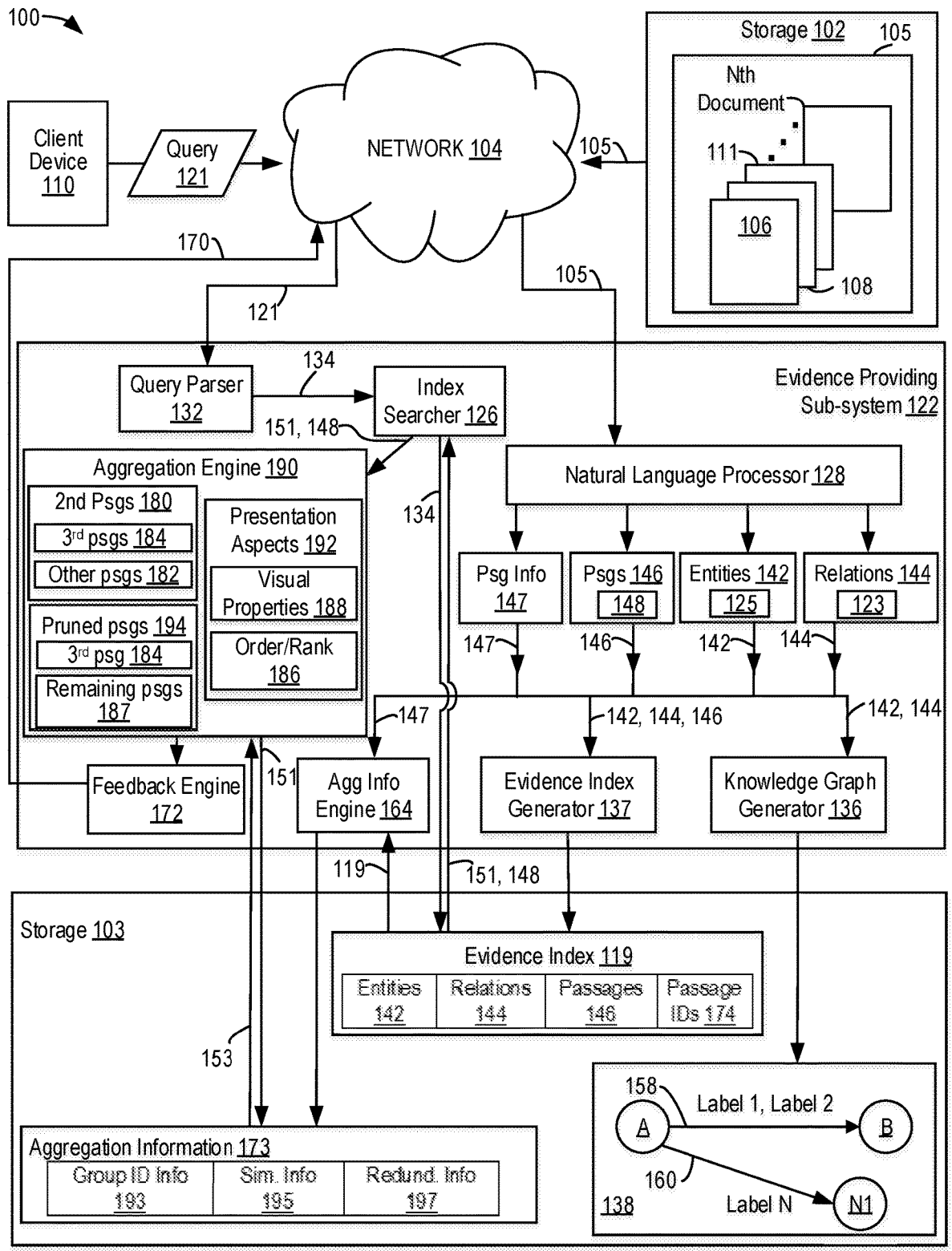
FIG. 1 is a block diagram view of an embodiment of a system according to the present disclosure.

FIG. 1 illustrates a block diagram of an example of a system 100 configured to determine and provide pruned evidence responsive to a query 121 using an evidence index 119 generated prior to receiving the query 121. The query 121 may be a relation query regarding one or more first relations 123 between first entities 125. The one or more first relations 123 and the first entities 125 are associated with first passages 148 of a text corpus 105. Additionally or alternatively, the query 121 may be an entity query regarding at least one of the first entities 125. Additionally or alternatively, the query 121 may be a passage query regarding the first passages 148. A relation query identifies the first entities 125 and seeks the one or more first relations 123 between the first entities 125. An entity query identifies at least one of the first entities 125 and the one or more first relations 123 and seeks at least one entity of the first entities 125 that is related to the at least one of the first entities 125 identified in the query 121 according to one or more first relations 123 identified in the query 121. A passage query identifies the one or more first relations 123 and seeks first passages 148 that provide evidence for the one or more first relations 123 identified in the query 121.

The system 100 includes a storage 102 that stores the text corpus 105 of documents (e.g., N documents, where N is greater than or equal to two). In the example illustrated in FIG. 1, the text corpus 105 of documents includes documents 106, 108, 111 . . . N (e.g., where N is greater than three). The storage 102 corresponds to or includes a tangible device that can retain and store the text corpus 105. The storage 102 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the storage 102 includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The system 100 additionally includes an evidence providing sub-system 122 coupled (e.g., physically or via a wireless or wired network 104) to the text corpus 105 (e.g., coupled to the storage 102). In some examples, the storage 102 is collocated with the evidence providing sub-system 122. For example, the storage 102 may be coupled to the evidence providing sub-system 122 via a bus or other physical connector. In other examples, the storage 102 is remotely located from the evidence providing sub-system 122. For example, the evidence providing sub-system 122 may be included in a first server, and the storage 102 may be embodied in one or more other servers that the first server communicates with via the wireless or wired network 104.

The evidence providing sub-system 122 includes a natural language processor 128 configured to determine the entities 142 (including the first entities 125) and the relations 144 (including the one or more first relations 123) between the entities 142 from the text corpus 105. In some examples, the entities 142 are determined using dictionary lookups against outside databases (e.g., DBPedia or Freebase), using a heuristic technique based on capitalization patterns, or using the output of a syntactic parser, such as a slot grammar (SG) parser (which will group first and last names into a single token, based on the overall syntax of the phrase). However, in other examples, different techniques are used to identify the entities 142.

In some examples, the natural language processor 128 is configured to process the text corpus 105 to determine the relations 144 based at least in part on detected syntactic relations between pairs of the entities 142 in one or more passages in the text corpus 105. In some examples, the natural language processor 128 is configured to process the text corpus 105 to identify the relations 144 using a syntactic parser (such as an SG parser) that will identify common syntactic patterns, statistical techniques like those used in a syntactic parser such as International Business Machines Corporation's (IBM™) Statistical Information and Relation Extraction (SIRE) toolkit, or graph-based post-processing of complex relations based on those syntactic relations. In an example of a graph-based post-processing of complex relations, the natural language processor 128 includes an automatic annotator that marks a relation between two words (entities) in a passage that are connected by syntactic relations.

In some examples, the evidence providing sub-system 122 includes a knowledge graph generator 136 configured to generate a knowledge graph 138 that references the entities 142 and the relations 144. In the example of the knowledge graph 138 illustrated in FIG. 1, the knowledge graph 138 includes nodes A, B, and N1, and directed edges 158 and 160. The nodes A, B, and N1 represent the entities 142, and the directed edges 158 and 160 indicate identified relations between respective pairs of the entities 142. In some examples, the relations 144 between the entities 142 may be represented in the knowledge graph 138 using edge labels, such as the labels Label 1, Label 2 associated with the directed edge 158 and the label Label N associated with the directed edge 160. To illustrate, the directed edge 158 in the knowledge graph 138 indicates at least one identified relation between entity A and entity B, and Label 1 and Label 2 represent the relations between the entity A and entity B. For example, Label 1 may represent the relation "married to" and the Label 2 may represent the relation "lives with". In this example, the directed edge 158, the labels Label 1 and Label 2, and the nodes A, B, collectively indicate that A is married to B and that A lives with B.

The natural language processor 128 is configured to determine passages 146 of the text corpus 105 that provide evidence for the relations 144 between the entities 142. The passages 146 include the first passages 148.

In some examples, the passages 146 correspond to passages from which the relations 144 between the entities 142 are determined or derived. In these examples, the first passages 148 correspond to passages of the text corpus 105 from which the one or more first relations 123 and the one or more first entities 125 are determined. In these examples, the natural language processor 128 may determine the first entities 125 and the one or more first relations 123 based on the first passages 148 in the text corpus 105, and may extract the first passages 148 from the text corpus 105 based on the first entities 125 and the one or more first relations 123 being determined from the first passages 148. For example, the natural language processor 128 may identify a first pair of entities in a particular passage of a document of the text corpus 105, may identify a syntactic relation between the first pair of entities in the particular passage as described above, and may determine the particular passage as evidence for the syntactic relation between the first pair of entities based on the syntactic relation between the first pair of entities being determined, derived, or present in the particular passage.

The evidence providing sub-system 122 includes an evidence index generator 137 configured to generate an evidence index 119 that associates the passages 146 (including the first passages 148) with a respective relation of the one or more relations 144 (including the one or more first relations 123) and with a respective pair of the entities 142 (including the first entities 125). The evidence index 119 may additionally associate the passages 146 with passage identifications (IDs) 174. The evidence index 119 may include or store the passages 146.

Table 1 provides an example of an evidence index 119 that may be generated by the evidence index generator 137. The example evidence index 119 of Table 1 includes an entities column that includes pairs of the entities 142. The example evidence index 119 of Table 1 also includes a relations column that associates each of the relations 144 with a corresponding pair of the entities 142. The example evidence index 119 of Table 1 also includes a passages column that stores each of the passages 146 in association with respective pairs of the entities 142 and respective relations 144 for which the passage provides evidence. To illustrate, passages D, E, and F may provide evidence for the relation indicated by Label 1 (in the knowledge graph 138) between the entities A, B. The example evidence index 119 of Table 1 therefore associates the entities A, B and the relation indicated by Label 1 with passages D, E, F. As another example, passages G, H may provide evidence for the relation indicated by Label 2 (in the knowledge graph 13) between the entities A, B. The example evidence index 119 of Table 1 therefore associates the entities A, B and the relation indicated by Label 2 with the passages G, H. The example evidence index 119 of Table 1 also includes passage ID column that stores passages IDs of respective passages. To illustrate, passages IDs P1, P2, and P3 may correspond to IDs of the passages D, E, and F, respectively, and the passage ID column in Table 1 may store the passage IDs P1, P2, and P3 in association with the passages D, E, and F. As another example, passage IDs P4 and P5 may correspond to IDs of the passages G and H, respectively, and the passage ID column in Table 1 may store the passage IDs P4 and P5 in association with the passages G and H.

TABLE 1

| Entities | Relations | Passages | Passage ID |
|----------|-----------|----------|------------|
| A, B | Label 1 | D, E, F | P1, P2, P3 |
| A, B | Label 2 | G, H | P4, P5 |
| . | . | . | . |
| . | . | . | . |
| A, N1 | Label N | J, K, L | P6, P7, PN |

The evidence providing sub-system 122 includes an aggregation information engine 164. The aggregation information engine 164 is configured to determine aggregation information 173 that the evidence providing sub-system 122 uses to prune passages and determine presentation aspects of the pruned passages as described in more detail below. The aggregation information engine 164 may determine the aggregation information 173 based on information from the natural language processor 128 and/or information from the evidence index 119. For example, the aggregation information engine 164 may receive the passage information 147 from the natural language processor 128, and may receive the entities 142, the relations 144, and the passages 146 from the evidence index 119. As another example, the aggregation information engine 164 may receive the passage information 146 from the natural language processor 128, and may receive the entities 142, the relations 144, and the passages from the natural language processor 128 so that the aggregation information engine 164 can generate the aggregation information 173 while the evidence index 119 is being generated.

In some examples, the aggregation information 173 is stored in an aggregation information index that is indexed according to passage ID. For example, Table 2 illustrates an example of an aggregation information index that indexes an example of the aggregation information 173 according to passage ID using the example passages described above with reference to the example of the evidence index 119 of Table 1. However, in other examples, the aggregation information 173 is stored in metadata fields of the evidence index 119, and thus does not need to be separately indexed.

TABLE 2

| Passage ID | Group ID | Similarity Scores | Redundancy Information |
|------------|----------|-------------------|------------------------|
| P1 | G1 | S1 | P2 |
| P2 | G1 | S2 | P1 |
| P3 | G2 | S3 | None |
| P4 | G3 | S4 | P5 |
| P5 | G4 | S5 | P4 |
| . | . | . | . |
| . | . | . | . |
| PN | GN | SN | None |

In the example illustrated in FIG. 1, the aggregation information 173 includes group ID information 193. The group ID information 193 relates each passage of the one or more passages 146 to one or more groups. The aggregation information engine 164 may determine the group ID information 193 using passage information 147 regarding the passages 146. The aggregation information engine 164 may retrieve the passage information 147 from the natural language processor 128. As an example, the passage information 147 may correspond to or identify a source (e.g., publication or website) of each of the passages 146. In this example, the one or more passages 146 may be grouped according to the source indicated in the passage information 147 such that passages from a same source are grouped in a same group. To illustrate, with reference to Table 2 above, the passages D and E associated with passage IDs P1 and P2 may be determined from a same document (e.g., document 106), and the aggregation information engine 164 may thus assign a same group ID (e.g., G1) to the passages D and E associated with the passage IDs P1 and P2.

The aggregation information 173 additionally or alternatively includes similarity information 195. The aggregation information engine 164 generates the similarity information 195 for each of the one or more passages 146. The similarity information 195 for a particular passage indicates a similarity between the particular passage and the entities and relation that the particular passage is associated with (e.g., the entities and relation for which the particular passage provides evidence). The entities and relation that a passage is associated with (e.g., the entities and relation that the passage provides evidence for) is referred to as an entities/relation combination. The similarity information 195 for a particular passage is determined at least in part by comparing the particular passage to its associated corresponding entity/relation combination along one or more similarity aspects to determine a similarity score for the particular passage.

For example with reference to Table 1 above, the passages D, E, and F are associated with the entities A, B and the relation indicated by Label 1 (e.g., the passages D, E, and F provide evidence for a first entities/relation combination A,B/Label 1). In this example, with reference to Table 2, the similarity information 195 for the passage D is determined at least in part by comparing the passage D with the first entities/relation combination to determine a similarity score S1 that indicates, at least in part, a similarity between the passage D and the first entities/relation combination. Likewise, the similarity information 195 for the passage E is determined at least in part by comparing the passage E with the first entities/relation combination to determine a similarity score S2 that indicates, at least in part, a similarity between the passage E and the first entities/relation combination. Likewise, the similarity information 195 for the passage F is determined at least in part by comparing the passage F with the first entities/relation combination to determine a similarity score S3 that indicates, at least in part, a similarity between the passage F and the first entities/relation combination.

As another example, with reference to Table 1 above, the passages G and H are associated with the entities A, B and the relation indicated by Label 2 (e.g., the passages G and H provide evidence for a second entities/relation combination A,B/Label 2). In this example, with reference to Table 2, the similarity information 195 for the passage G is determined at least in part by comparing the passage G with the second entities/relation combination to determine a similarity score S4 that indicates, at least in part, a similarity between the passage G and the second entities/relation combination. As another example, the similarity information 195 for the passage H is determined at least in part by comparing the passage H with the second entities/relation combination to determine a similarity score S5 that indicates, at least in part, a similarity between the passage H and the second entities/relation combination.

In some examples, the similarity score for a given passage corresponds to a matrix that stores multiple similarity scores for the given passage according to different categories of similarity. Some examples of different aspects along which similarity may be computed for a passage include: 1) computed scores such as cosine scores or term frequency-inverse document frequency (TF-IDF) scores; 2) whether the passage contains a direct mention of the first entities 125 (e.g., whether the passage directly mentions entities A, B); and 3) whether the passage contains an indirect reference of the first entities 125 (e.g., he, she, they, etc.).

For example, the matrix for a given passage may include an entry for the computed score(s) (e.g., based on a computed cosine score or a computed TF-IDF score). In this example, the aggregation information engine 164 is configured to process each of the passages 146 along with respective entities/relation combinations to determine the computed score(s) for each of the passages 146. To illustrate, the aggregation information engine 164 may process the passage D and the first entities/relation combination to determine a computed cosine score for the passage D. In this example, the similarity score S1 may include a matrix including multiple entries, and a first of the multiple entries of the similarity score S1 may represent the cosine score computed for the passage D and the first entities/relation combination. Alternatively or additionally, the aggregation information engine 164 may process the passage D and the first entities/relation combination to determine a computed TF-IDF score for the passage D. In this example, the matrix of the similarity score S1 may include an entry that represents the TF-IDF score computed for the passage D and the first entities/relation combination.

Additionally or alternatively, the matrix for a given passage may include an entry indicating whether the passage includes direct mentions of the entities. This entry may correspond to a sum of a value (e.g., one) assigned for each direct mention in the passage of an entity of the corresponding entities/relation combination, or a value of zero when the given passage does not directly mention any of the entities of the corresponding entities/relation combination. For example, the matrix for the similarity score may additionally or alternatively include an entry that represents whether the passage D directly mentions both entities A, B. When the passage D directly mentions both entities A,B, this entry may correspond to the value two (2).

Additionally or alternatively, the matrix for a given passage may include an entry indicating whether the passage includes indirect mentions of the entities. This entry may correspond to a sum of a value (e.g., one) assigned for each indirect mention in the passage of an entity of the entities A, B or a value of zero when the given passage does not indirectly mention the entities A, B.

In some examples, the similarity information 195 (e.g., the matrices that store similarity scores) may additionally include a measure indicating how valid a given passage is. For example, the similarity information 195 for a given passage may indicate whether the passage is sourced from an authoritative source (such as White House communication versus a tabloid). In an example, the matrix of similarity scores for a given passage may include an entry corresponding to particular value (e.g., one) for an authoritative source, or corresponding to a different value (e.g., zero) for a non-authoritative source. For example, the aggregation information engine 164 may determine whether a source of a particular passage is authoritative or non-authoritative based on the passage information 147, and may add an entry to a matrix for the particular passage that represents whether the particular passage is authoritative or non-authoritative.

The aggregation information 173 additionally or alternatively includes redundancy information 197. The redundancy information 197 indicates whether passages associated with a given entity/relation combination are redundant or substantially similar to (e.g., paraphrases of) at least one other passage associated with the entity/relation combination. For example with reference to Table 2, the aggregation information 173 may indicate that the passage E associated with the passage ID P2 is redundant or substantially similar to the passage D associated with the passage ID P1 by storing the passage ID P2 in the redundancy information 197 associated with the passage D. As another example, the aggregation information 173 may indicate that the passage D associated with the passage ID P1 is redundant or substantially similar to the passage E associated with the passage ID P2 by storing the passage ID P1 in the redundancy information 197 associated with the passage E. As another example, the aggregation information 173 may indicate that the passage F is not redundant or substantially similar to any other of the passages that provide evidence for the entity/relation combination of A,B/Label 1 (e.g., is not redundant to passages D or E) by storing an indication of non-redundancy (e.g., the word "None") in the redundancy information 197 associated with the passage F. As another example, the aggregation information 173 may indicate that the passage H associated with the passage ID P5 is redundant or substantially similar to the passage G associated with the passage ID P4 by storing the passage ID P5 in the redundancy information 197 associated with the passage G. As another example, the aggregation information 173 may indicate that the passage G associated with the passage ID P4 is redundant or substantially similar to the passage H associated with the passage ID P5 by storing the passage ID P4 in the redundancy information 197 associated with the passage H.

In some examples, the aggregation information engine 164 may determine whether each of the passages 146 is redundant or substantially similar to another passage associated with the same entities/relation combination. The aggregation information engine 164 may determine that a pair of the passages 146 is redundant when the similarity score determined for the pair of the passages 146 satisfies a threshold. To illustrate, the aggregation information engine 164 may determine similarity scores for the pair of passages D, E, the pair of passages D, F, the pair of passages E, F, and the pair of passages G, H. The aggregation information engine 164 may determine that the passage D and the passage E are redundant or substantially similar to each other based on the similarity score for the passage pair D, E satisfying (e.g., exceeding) a threshold, and may determine that the passage F is not redundant or substantially similar to any of the other passages that provide evidence for the entity/relation combination A,B/Label 1 based on the similarity score for the passage pairs D, F and E, F not satisfying (e.g., not exceeding) the threshold.

The evidence providing sub-system 122 includes a query parser 132 configured to receive the query 121. As mentioned above, the query 121 may be a relation query regarding the one or more first relations 123, an entity query regarding at least one of the first entities 125, or a passage query regarding the first passages 148. In an illustrative example in which the query 121 corresponds to a natural language relation query, the query 121 corresponds to the question "How is A related to B?". In this example and with reference to the example knowledge graph 138, the query 121 seeks the relations Label 1 and Label 2. In an illustrative example in which the query 121 corresponds to a natural language entity query, the query 121 corresponds to "Who is married to B?", where "married to" corresponds to the relation represented by Label 1 in the example of the knowledge graph 138 in FIG. 1. In this example and with reference to the example of the knowledge graph 138 in FIG. 1, the query 121 seeks the entity A.

A passage query may be generated by the client device 110 responsive to a user of the client device 110 selecting (e.g., clicking on) a directed edge in the knowledge graph 138. To illustrate with reference to the example of the knowledge graph 138 illustrated in FIG. 1, the user of the client device 110 may select the directed edge 158. In this first example of a passage query, the client device 110 may generate a query 121 that identifies the first entities 125 (e.g., entities A, B) associated with the directed edge 158, and/or that identifies the relations indicated by Label 1 and Label 2 in the knowledge graph 138. As another example, the passage query may be generated by the client device 110 responsive to a user of the client device 110 selecting a label in the knowledge graph 138. To illustrate with reference to the example of the knowledge graph 138 illustrated in FIG. 1, the user of the client device 110 may select the Label 1 in the knowledge graph 138. In this second example of a passage query, the client device 110 may generate a query 121 that identifies the first entities 125 (e.g., A, B) associated with the Label 1, and/or that identifies the relation indicated by the Label 1 in the example of the knowledge graph 138 in FIG. 1.

The query parser 132 is configured to parse the query 121 to determine entity/relation information 134. When the query 121 corresponds to a relation query, the entity/relation information 134 corresponds to the first entities 125 identified in the query 121. To illustrate using the above example of the query 121 "How is A related to B?", the query parser 132 may parse the query 121 to identify the entities A, B in the query 121. In this example, the entity/relation information 134 corresponds to the entities A, B. When the query 121 corresponds to an entity query, the entity/relation information 134 corresponds to the one or more entities identified in the query 121 and the one or more first relations 123 identified in the query 121. To illustrate using the above example of the query 121 "Who is married to B?", the query parser 132 may parse the query 121 to identify the entity B and the relation "married to" (which may correspond to the Label 1 in the example of the knowledge graph 138 illustrated in FIG. 1). In this example, the entity/relation information 134 corresponds to the entity B and the one or more first relations 123 corresponding to Label 1. When the query 121 is a natural language query, the query parser 132 is configured to determine the subject, predicate, and object of the query input in order to identify entities and/or relations in the query 121. In an embodiment, the query parser 132 is also configured to perform tokenization and segmentation, morpholexical analysis, semantic analysis, and syntactic analysis. In some examples, the query parser 132 also includes a part-of-speech (POS) tagger to tag the parts of speech such as noun, verb, adjective, adverb, qualifier/intensifier, determiner, preposition, subordinating conjunction, and coordinating conjunction in order to identify the one or more entities.

When the query 121 corresponds to a passage query, the entity/relation information 134 corresponds to the first entities 125 in the query 121 and/or the one or more first relations 123 identified in the query 121. To illustrate using the above first example passage query generated responsive to the user of the client device 110 selecting the directed edge 158, the query parser 132 may parse the query 121 to identify the entities A, B and the relations represented by Label 1 and Label 2. To illustrate using the above example second passage query generated responsive to the user of the client device 110 selecting the Label 1, the query parser 132 may parse the query 121 to identify the entities A, B and the relation represented by the Label 1.

The evidence providing sub-system 122 includes an index searcher 126 configured to identify, using the evidence index 119, the first passages 148 responsive to receiving the query 121. The index searcher 126 may determine the first passages 148 using the entity/relation information 134.

For example, when the query 121 corresponds to the example relation query above, the index searcher 126 may access the evidence index 119 using the entities A, B and/or the labels Label 1 and Label 2 as indices, and may identify the passages D, E, F, G, H, and I corresponding to the indices as the first passages 148.

As another example, when the query 121 corresponds to the above example entity query, the index searcher 126 may access the evidence index 119 using the entities A, B and the relation Label 1 as indices, and may determine the passages D, E, F as the first passages 148.

As another example, when the query 121 corresponds to the above first example passage query, the index searcher 126 may access the evidence index 119 using the entities A, B and/or the labels Label 1 and Label 2 as indices, and may identify the passages D, E, F, G, H, and I corresponding to the indices as the first passages 148. As another example, when the query 121 corresponds to the above second example passage query, the index searcher 126 may access the evidence index 119 using the entities A, B and the Label 1 as indices, and may identify the passages D, E, and F corresponding to the indices as the first passages 148.

Because the evidence index 119, including the first passages 148, is generated prior to receiving the query 121, the system 100 can determine the first passages 148 associated with the query 121 without having to process the text corpus 105 after receiving the query 121. Thus, the system 100 does not experience processing delays that systems that determine passages or evidence for a query by processing documents for evidence after the query is received.

The evidence providing sub-system 122 includes an aggregation engine 190 configured to retrieve, from the aggregation information 173, aggregation information 153 associated with the first passages 148. In examples in which the aggregation information 173 is stored in an aggregation index, the index searcher 126 may provide first passage IDs 151 of the first passages 148 to the aggregation engine 190, and the aggregation engine 190 may retrieve the aggregation information 153 associated with the first passages 148 from the storage 103 using the first passage IDs 151. In examples in which the aggregation information 173 is stored in metadata fields in the evidence index 119, the index searcher 126 retrieves the first passage IDs 151 and the aggregation information 153 associated with the first passages 148 from the metadata fields.

To illustrate, with reference to Table 2 and the above examples in which the first passages 148 correspond to passages D, E, and F, the aggregation information 153 corresponds to the group ID information 193, similarity information 195, and redundancy information 197 associated with the passage IDs P1, P2, and P3. To illustrate, with reference to Table 2 and the above examples in which the first passages 148 correspond to passages D, E, F, G, and H, the aggregation information 153 corresponds to the group ID information 193, similarity information 195, and redundancy information 197 associated with the passage IDs P1, P2, P3, P4, and P5.

The aggregation engine 190 processes the aggregation information 153 associated with the first passages 148 to determine presentation aspects 192 and pruned passages 194. The presentation aspects 192 may include an order/rank 186 of the first passages 148 and visual properties 188 (e.g., font darkness, font size, font style . . . etc.) according to which the passages are to be presented to the user. The aggregation engine 190 may determine the presentation aspects 192 according to the similarity information 195 in the aggregation information 153 associated with the first passages 148. For example, the aggregation engine 190 may determine a similarity score for each of the first passages 148 and may order or rank the first passages 148 according to the similarity score.

To illustrate with reference to Table 2, in an example in which the first passages 148 correspond to the passages D, E, and F, the similarity score S2 may be greater than the similarity score S 1, and the similarity score S1 may be greater than the similarity score S3. In this example, the aggregation engine 190 determines a rank or order of E, D, F based on the similarity information 195 for the first passages 148 indicating that the similarity score S2 for the passage E is greater than the similarity score S1 for the passage D, and that the similarity score S1 for the passage D is greater than the similarity score S3 for the passage F.

As another example with reference to Table 2, in an example in which the first passages 148 correspond to the passages D, E, F, G, and H, the similarity score S2 may be greater than the similarity score S 1, the similarity score S1 may be greater than the similarity score S3, the similarity score S3 may be greater than the similarity score S5, and the similarity score S5 may be greater than the similarity score S4. In this example, the aggregation engine 190 determines a rank or order of E, D, F, H, and G based on the similarity information 195 for the first passages 148 indicating that the similarity score S2 for the passage E is greater than the similarity score S1 for the passage D, that the similarity score S1 for the passage D is greater than the similarity score S3 for the passage F, that the similarity score S3 for the passage F is greater than the similarity score S5 for the passage H, and that the similarity score S5 for the passage H is greater than the similarity score S4 for the passage G.

The aggregation engine 190 is additionally configured to determine that second passages 180 of the first passages 148 are redundant or substantially similar to at least one other passage of the first passages 148. For example, the aggregation engine 190 may determine that the second passages 180 of the first passages 148 are redundant or substantially similar to at least one other passage of the first passages 148 based on the redundancy information 197 in the aggregation information 153 associated with the first passages 148. The second passages 180 include one or more third passages 184 and one or more other passages 182.

The aggregation engine 190 may prune the first passages 148 to generate a pruned set of passages 194 that does not include any of the one or more other passages 182 of the second passages 180 and that includes the one or more third passage 184 of the second passages 180 and any remaining passages 187 of the first passages 148. In some examples, the one or more third passages 184 correspond to the highest ranked of the second passages 180. Thus, in these examples, the aggregation engine 190 removes lower ranked redundant or substantially similar passages from the first passages 148 to generate the pruned passages 194.

To illustrate with reference to Table 2, when the first passages 148 correspond to the passages D, E, and F (e.g., when the query 121 corresponds to the above example entity query or to the above example passage query regarding the relation indicated by Label 1), the redundancy information 197 in the aggregation information 153 indicates that the passage E associated with passage ID P2 is redundant or substantially similar to the passage D associated with passage ID P1. In this example, passages D and E correspond to the second passages 180. Responsive to determining that the passage E associated with the passage ID P2 is redundant or substantially similar to the passage D associated with the passage ID P1, the aggregation engine 190 may determine which of the passages D or E is ranked or ordered higher based on the order/rank 186. For example, passage E may be ranked higher than passage D. Thus, in this example, passage E corresponds to the one or more third passages 184, and the aggregation engine 190 prunes the first passages 148 to determine the pruned passages 194 that do not include the passage D and that include the third passage 184 (e.g., passage E) and the remaining passages 187 (e.g., passage F) of the first passages 148.

As another example, when the first passages 148 correspond to the passages D, E, F, G, and H (e.g., when the query 121 corresponds to the example relation query above or to the example passage query above regarding the directed edge 158), the redundancy information 197 in the aggregation information 173 indicates that the passage E associated with passage ID P2 is redundant or substantially similar to the passage D associated with passage ID P1, and that the passage G associated with the passage ID P4 is redundant or substantially similar to the passage H associated with the passage ID P5. In this example, passages D, E, G, and H correspond to the second passages 180. Based on determining that the passage E associated with the passage ID P2 is redundant or substantially similar to the passage D associated with the passage ID P1, the aggregation engine 190 may determine which of the passages D or E is ranked or ordered higher based on the presentation aspects 192 (e.g., based on the order/rank 186). For example, passage E may be ranked higher than passage D. Based on determining that the passage G associated with the passage ID P4 is redundant or substantially similar to the passage H associated with the passage ID P5, the aggregation engine 190 may determine which of the passages G or H is ranked or ordered higher based on the presentation aspects 192 (e.g., based on the order/rank 186). For example, passage H may be ranked higher than passage G. Based on the passage E being the highest ranked passage of the second passages 180 associated with the first entities/relation combination, the aggregation engine 190 may designate the passage E as a passage of the one or more third passages 184. Additionally, based on the passage H being the highest ranked passage of the second passages 180 associated with the second entities/relation combination, the aggregation engine 190 may additionally designate the passage H as a passage of the one or more third passages 184. Thus, in this example, the one or more third passages 184 correspond to the passages E and H, and the one or more other passages 182 of the second passages 180 correspond to the passages D and G. In this example, the one or more remaining passages 187 of the first passages 148 (e.g., the passages of the first passages 148 that are not second passages 180) corresponds to the passage F. In this example, the aggregation engine 190 prunes the first passages 148 to determine the pruned passages 194 that do not include the one or more other passages 182 (the passages D and G) and that include the one or more third passages 184 (e.g., passages E and H) and the one or more remaining passages 187 (e.g., passage F).

Subsequent to determining the pruned passages 194, the aggregation engine 190 may determine the visual properties 188 of the pruned passages 194. For example, the aggregation engine 190 may determine the visual properties 188 of the pruned passages 194 based on the similarity information 195 associated with the pruned passages 194. For example, the aggregation engine 190 may assign visual properties 188 to the pruned passages 194 to emphasize the pruned passages 194 that have a higher similarity score. For example, the visual properties 188 may include a font darkness. In this example, the aggregation engine 190 may assign a darker font darkness to the passage E than the passage F based on the similarity score S2 for the passage E being greater than the similarity score S3 for the passage F.

In some examples, the query 121 includes an instruction to group the pruned passages 194 by group ID and/or to further prune the first passages 148 to determine the pruned passages 194 using the group ID. For example, the query 121 may indicate that the user of the client device 110 wants the pruned passages 194 to be presented such that all of the pruned passages 194 that are in a particular group (e.g., from a particular source) are grouped together. In this example, the aggregation engine 190 may additionally determine presentation aspects 192 that include a grouping aspect. In this example, the presentation aspects 192 provided to the feedback engine 172 include an instruction that causes the feedback engine 172 to group the pruned passages according to the group ID such that the pruned passages 194 are grouped together when presented to the user via the client device 110. As another example, the query 121 may indicate that the user of the client device 110 would only like evidence from a particular source (e.g., particular group ID). In this example, the aggregation engine 190 may further prune the first passages to remove passages that do not include the particular group ID.

The evidence providing sub-system 122 includes a feedback engine 172 configured to output the pruned set of passages 170 according to the presentation aspects 192 responsive to the query 121. In some example, the feedback engine 172 outputs the pruned set of passages 194 according to the presentation aspects 192 by transmitting an output 170 that includes the pruned set of passages 197 and an instruction to display or present the pruned set of passages 197 according to the presentation aspects 192.

In this manner, the system 100 avoids overloading a user with redundant evidence by reducing a number of passages that a user would be exposed to compared to systems that output all evidence passages.

Figure 2:
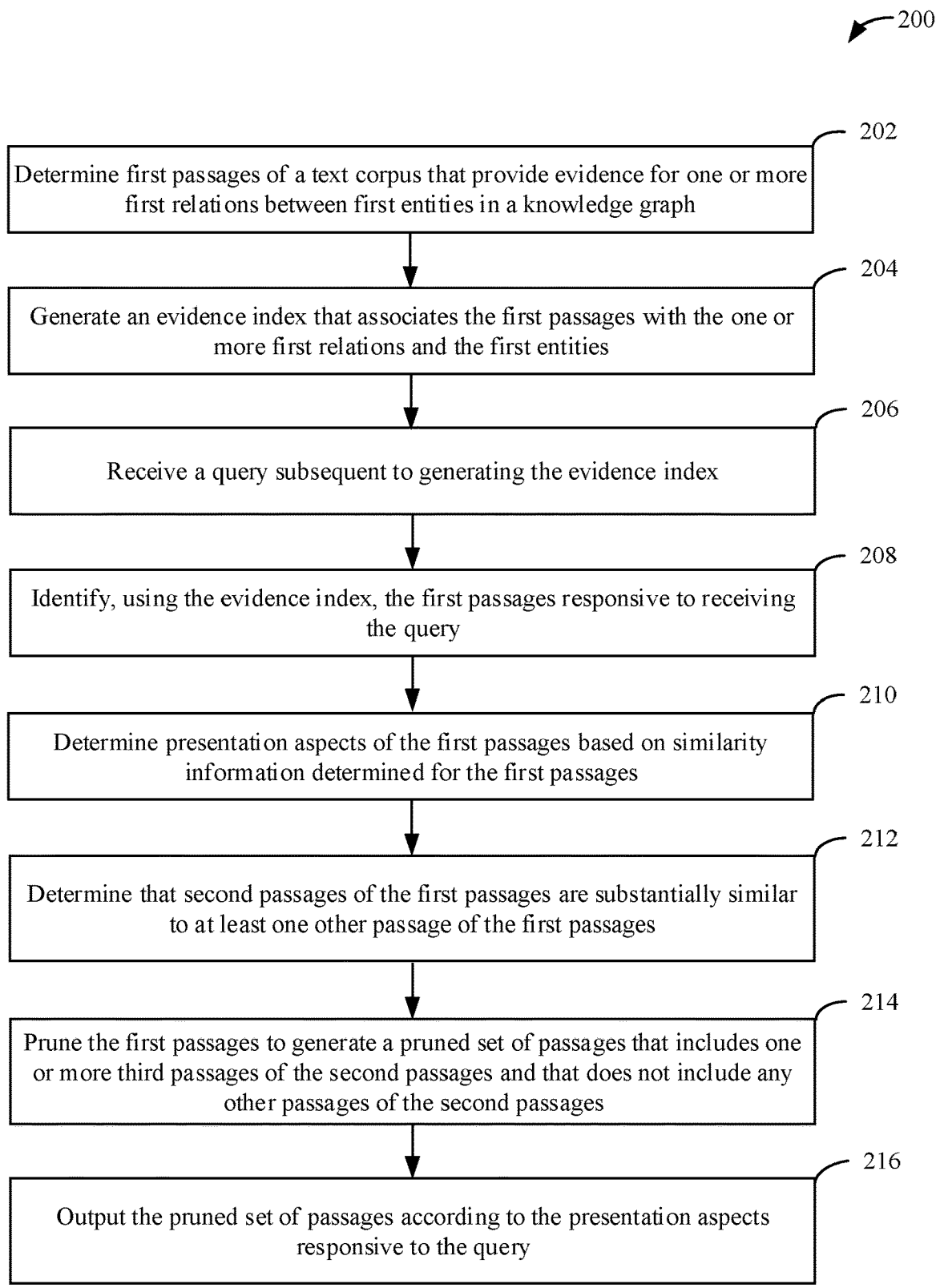
FIG. 2 is a flowchart showing an embodiment of a method performed, at least in part, by the system of FIG. 1.

FIG. 2 is a flowchart of a computer-implemented method 200 to determine and provide pruned evidence responsive to a query using an evidence index generated prior to receiving the query. The computer-implemented method 200 may be performed by one or more components of the system 100 of FIG. 1.

The computer-implemented method 200 includes determining, at 202, first passages of a text corpus that provide evidence for one or more first relations between first entities in a knowledge graph. The first passages may correspond to the first passages 148 described above with reference to FIG. 1, the text corpus may correspond to the text corpus 105 described above with reference to FIG. 1, the one or more first relations may correspond to the one or more first relations 123 described above with reference to FIG. 1, the first entities may correspond to the first entities 125 described above with reference to FIG. 1, and the knowledge graph may correspond to the knowledge graph 138 described above with reference to FIG. 1. The first passages 148 may be determined by the natural language processor 128 of FIG. 1 as described above with reference to FIG. 1.

The computer-implemented method 200 further includes generating, at 204, an evidence index that associated the first passages with the one or more first relations and the first entities. For example, the evidence index may correspond to the evidence index 119 described above with reference to FIG. 1, and the evidence index may be generated by the evidence index generator 137 of FIG. 1 as described above with reference to FIG. 1.

The computer-implemented method 200 further includes receiving, at 206, a query subsequent to generating the evidence index. For example, the query may correspond to the query 121 described above with reference to FIG. 1, and the query may be received by the query parser 132 of FIG. 1 from the client device 110 of FIG. 1 as described above with reference to FIG. 1. The query is a relation query regarding the one or more first relations, an entity query regarding at least one of the first entities, or a passage query regarding the first passages as described above with reference to FIG. 1.

The computer-implemented method 200 further includes identifying, at 208, using the evidence index, the first passages responsive to receiving the query. For example, the index searcher 126 of FIG. 1 may identify the first passages 148 of FIG. 1 using the entity/relation information 134 of FIG. 1 to access the evidence index 119 of FIG. 1 to retrieve the first passage IDs 151 and/or the first passages 148 as described above with reference to FIG. 1.

The computer-implemented method 200 further includes determining, at 210, presentation aspects of the first passages based on similarity information determined for the first passages. The presentation aspects may correspond to the presentation aspects 192 described above with reference to FIG. 1, and may be determined by the aggregation engine 190 as described above with reference to FIG. 1. The similarity information may correspond to the similarity information 195 described above with reference to FIG. 1, and may be determined by the aggregation information engine 164 of FIG. 1 as described above with reference to FIG. 1. In some examples, the similarity information is determined prior to receiving the query. In some example, including in some examples in which the similarity information is determined prior to receiving the query, the similarity information indicates how similar the first passages are to the query. In some examples, the similarity information for each of the first passages includes a matrix of similarity scores determined along multiple aspects. For example, the multiple aspects may correspond to the multiple aspects described above with reference to the similarity information 195 of FIG. 1.

The computer-implemented method 200 further includes determining, at 212, that second passages of the first passages are substantially similar to at least one other passage of the first passages. For example, the second passages may correspond to the second passages 180 described above with reference to FIG. 1, and may be determined by the aggregation engine 190 of FIG. 1 as described above with reference to FIG. 1.

The computer-implemented method 200 further includes pruning, at 214, the first passages to generate a pruned set of passages that includes one or more third passages of the second passages and that does not include any other passages of the second passages. For example, the pruned set of passages may correspond to the pruned set of passages 194 described above with reference to FIG. 1, the one or more third passages may correspond to the one or more third passages 184 described above with reference to FIG. 1, the other passages of the second passages may correspond to the other passages 182 described above with reference to FIG. 1, and the one or more other third passages and the pruned passages may be determined by the aggregation engine 190 as described above with reference to FIG. 1.

The computer-implemented method 200 further includes outputting, at 216, the pruned set of passages according to the presentation aspects responsive to the query. For example, the pruned set of passages may be output by the feedback engine 172 of FIG. 1 as described above with reference to FIG. 1.

Figure 3:
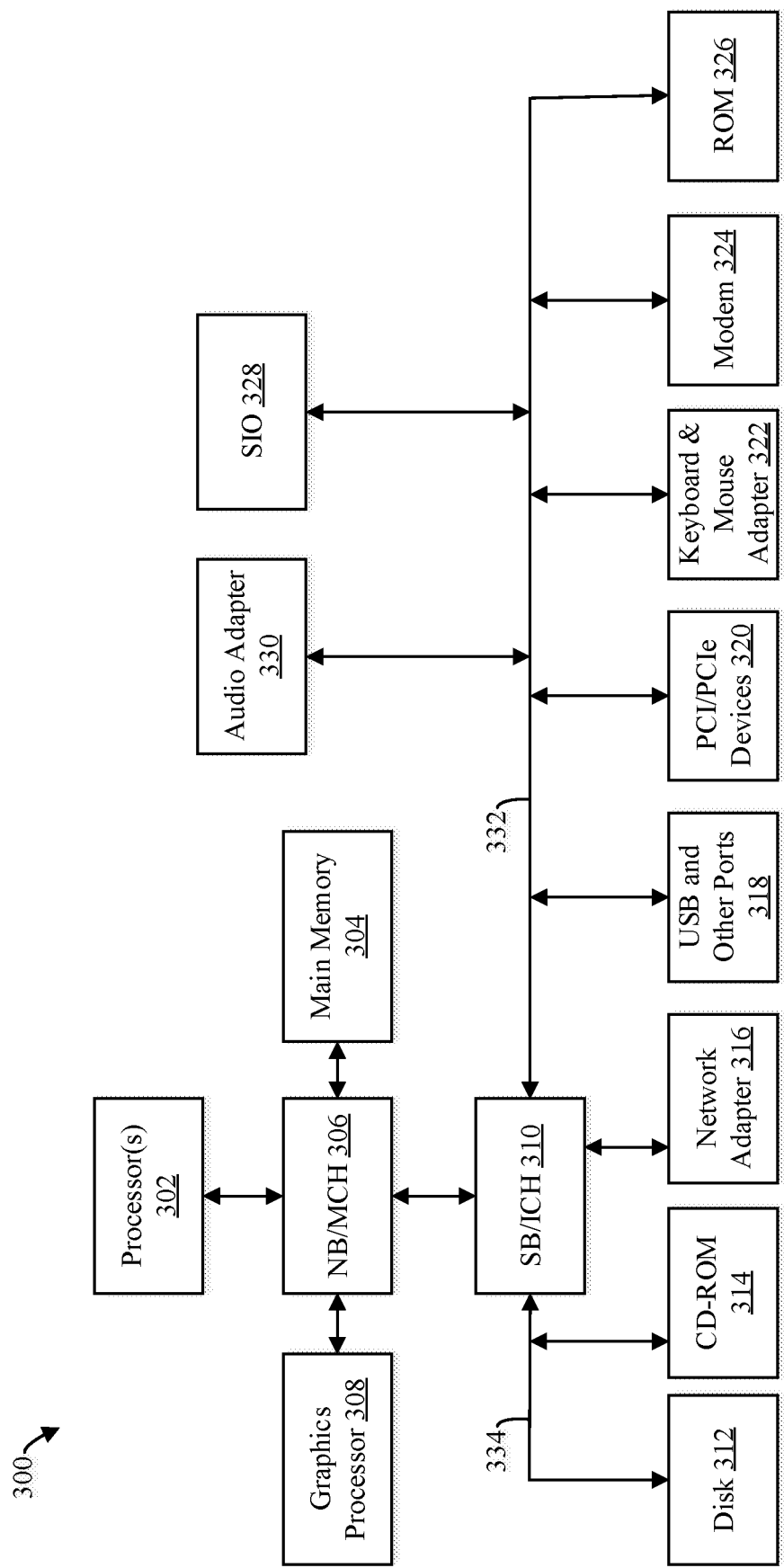
FIG. 3 shows an illustrative block diagram of an example data processing system that can be applied to implement embodiments of the present disclosure.

FIG. 3 is a block diagram of an example data processing system in which aspects of the illustrative embodiments may be implemented. Data processing system 300 is an example of a computer that can be applied to implement one or more components the system 100 of FIG. 1 (e.g., the evidence providing sub-system 122 of FIG. 1) and in which computer usable code or instructions implementing the processes for illustrative embodiments of the present disclosure may be located. In one illustrative embodiment, FIG. 3 represents a computing device that implements the one or more components of the system 100 of FIG. 1 augmented to include the additional mechanisms of the illustrative embodiments described hereafter.

In the depicted example, data processing system 300 employs a hub architecture including north bridge and memory controller hub (NB/MCH) 306 and south bridge and input/output (I/O) controller hub (SB/ICH) 310. Processor(s) 302, main memory 304, and graphics processor 308 are connected to NB/MCH 306. Graphics processor 308 may be connected to NB/MCH 306 through an accelerated graphics port (AGP).

In the depicted example, local area network (LAN) adapter 316 connects to SB/ICH 310. Audio adapter 330, keyboard and mouse adapter 322, modem 324, read only memory (ROM) 326, hard disc drive (HDD) 312, compact disc ROM (CD-ROM) drive 314, universal serial bus (USB) ports and other communication ports 318, and peripheral component interconnect (PCI) or PCI Express (PCIe) devices 320 connect to SB/ICH 310 through bus 332 and bus 334. PCI/PCIe devices may include, for example, Ethernet adapters, add-in cards, and personal computer (PC) cards for notebook computers. PCI uses a card bus controller, while PCIe does not. ROM 326 may be, for example, a flash basic input/output system (BIOS).

HDD 312 and CD-ROM drive 314 connect to SB/ICH 310 through bus 334. HDD 312 and CD-ROM drive 314 may use, for example, an integrated drive electronics (IDE) or serial advanced technology attachment (SATA) interface. Super I/O (SIO) device 328 may be connected to SB/ICH 310.

An operating system runs on processor(s) 302. The operating system coordinates and provides control of various components within the data processing system 300 in FIG. 3. In some embodiments, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 300.

In some embodiments, data processing system 300 may be, for example, an IBM® eServer™ System P® computer system, running the Advanced Interactive Executive (AIX®) operating system or the LINUX® operating system. Data processing system 300 may be a symmetric multiprocessor (SMP) system including a plurality of processors 302. Alternatively, a single processor system may be employed.

Instructions for the operating system, the object-oriented programming system, and applications or programs are located on storage devices, such as HDD 312, and may be loaded into main memory 304 for execution by processor(s) 302. The processes for illustrative embodiments of the present disclosure may be performed by processor(s) 302 using computer usable program code, which may be located in a memory such as, for example, main memory 304, ROM 326, or in one or more peripheral devices 312 and 314, for example.

A bus system, such as bus 332 or bus 334 as shown in FIG. 3, may include one or more buses. The bus system may be implemented using any type of communication fabric or architecture that provides for a transfer of data between different components or devices attached to the fabric or architecture. A communication unit, such as modem 324 or network adapter 316 of FIG. 3, may include one or more devices used to transmit and receive data. A memory may be, for example, main memory 304, ROM 326, or a cache such as found in NB/MCH 306 in FIG. 3.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read only memory (EPROM) or Flash memory, a static RAM (SRAM), a portable CD-ROM, a digital video disc (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or eternal storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining first passages of a text corpus that provide evidence for one or more first relations between first entities in a knowledge graph;
   generating an evidence index that associates the first passages with the one or more first relations and the first entities;
   receiving a query subsequent to generating the evidence index;
   identifying, using the evidence index, the first passages responsive to receiving the query and without searching the text corpus after receiving the query to identify the first passages;
   determining presentation aspects of the first passages based on similarity information determined for the first passages, the presentation aspects including at least visual properties for formatting text of passages output responsive to the query;
   determining that second passages of the first passages are substantially similar to each other;
   pruning the first passages to generate a pruned set of passages that includes one or more third passages including a passage from among the second passages that is determined to have a highest similarity from among the second passages to the one or more first relations and the first entities and a remainder of the first passages not included in the second passages; and
   outputting the pruned set of passages according to the presentation aspects responsive to the query.

2. The computer-implemented method of claim 1, wherein the query is a relation query regarding the one or more first relations, an entity query regarding at least one of the first entities, or a passage query regarding the first passages.

3. The computer-implemented method of claim 1, wherein the second passages are determined to be substantially similar to at least one other passage of the second passage when the second passages are paraphrases of the at least one other passage.

4. The computer-implemented method of claim 1, wherein the similarity information is determined prior to receiving the query.

5. The computer-implemented method of claim 4, wherein the similarity information indicates how similar the first passages are to the query.

6. The computer-implemented method of claim 1, wherein the similarity information for each of the first passages includes a matrix of similarity scores determined along multiple aspects of similarity.

7. A non-transitory computer readable storage media storing instructions that, when executed by a computer, cause the computer to:
   determine first passages of a text corpus that provide evidence for one or more first relations between first entities in a knowledge graph;
   generate an evidence index that associates the first passages with the one or more first relations and the first entities;
   receive a query subsequent to generating the evidence index;
   identify, using the evidence index, the first passages responsive to receiving the query and without searching the text corpus after receiving the query to identify the first passages;
   determine presentation aspects of the first passages based on similarity information determined for the first passages, the presentation aspects including at least visual properties for formatting text of passages output responsive to the query;
   determine that second passages of the first passages are substantially similar to each other;
   prune the first passages to generate a pruned set of passages that includes one or more third passages including a passage from among the second passages that is determined to have a highest similarity from among the second passages to the one or more first relations and the first entities and a remainder of the first passages not included in the second passages; and
   output the pruned set of passages according to the presentation aspects responsive to the query.

8. The computer readable storage media of claim 7, wherein the query is a relation query regarding the one or more first relations, an entity query regarding at least one of the first entities, or a passage query regarding the first passages.

9. The computer readable storage media of claim 7, wherein the second passages are determined to be substantially similar to at least one other passage of the first passages when the second passages are paraphrases of the at least one other passage.

10. The computer readable storage media of claim 7, wherein the similarity information is determined prior to receiving the query.

11. The computer readable storage media of claim 10, wherein the similarity information indicates how similar the first passages are to the query.

12. The computer readable storage media of claim 10, wherein the similarity information for each of the first passages includes a matrix of similarity scores determined along multiple aspects of similarity.

13. The computer readable storage media of claim 12, wherein the multiple aspects for each passage of the first passages includes whether the passage includes a direct mention of the first entities.

14. A computer system, comprising:
   memory storing program instructions; and
   a processor coupled to the memory and configured to execute the program instructions stored on the memory to cause the processor to:
      determine first passages of a text corpus that provide evidence for one or more first relations between first entities in a knowledge graph;
      generate an evidence index that associates the first passages with the one or more first relations and the first entities;
      receive a query subsequent to generating the evidence index;
      identify, using the evidence index, the first passages responsive to receiving the query and without searching the text corpus after receiving the query to identify the first passages;
      determine presentation aspects of the first passages based on similarity information determined for the first passages, the presentation aspects including at least visual properties for formatting text of passages output responsive to the query;
      determine that second passages of the first passages are substantially similar to each other;
      prune the first passages to generate a pruned set of passages that includes one or more third passages including a passage from among the second passages that is determined to have a highest similarity from among the second passages to the one or more first relations and the first entities and a remainder of the first passages not included in the second passages; and
      output the pruned set of passages according to the presentation aspects responsive to the query.

15. The computer system of claim 14, wherein the query is a relation query regarding the one or more first relations, an entity query regarding at least one of the first entities, or a passage query regarding the first passages.

16. The computer system of claim 14, wherein the second passages are determined to be substantially similar to at least one other passage of the second passage when the second passages are paraphrases of the at least one other passage.

17. The computer system of claim 14, wherein the similarity information is determined prior to receiving the query.

18. The computer system of claim 17, wherein the similarity information indicates how similar the first passages are to the query.

19. The computer system of claim 14, wherein the similarity information for each of the first passages includes a matrix of similarity scores determined along multiple aspects of similarity.

20. The computer system of claim 19, wherein the multiple aspects for each passage of the first passages includes whether the passage includes a direct mention of the first entities.

* * * * *